United States Patent
Kolb et al.

(10) Patent No.: US 10,890,153 B2
(45) Date of Patent: Jan. 12, 2021

(54) VALVE, IN PARTICULAR A SUCTION VALVE, IN A HIGH-PRESSURE PUMP OF A FUEL INJECTION SYSTEM

(71) Applicant: Robert Bosch GmbH, Stuttgart (DE)

(72) Inventors: Stefan Kolb, Gaertringen (DE); Steffen Holm, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 103 days.

(21) Appl. No.: 16/092,361

(22) PCT Filed: Mar. 1, 2017

(86) PCT No.: PCT/EP2017/054766
§ 371 (c)(1),
(2) Date: Oct. 9, 2018

(87) PCT Pub. No.: WO2017/178149
PCT Pub. Date: Oct. 19, 2017

(65) Prior Publication Data
US 2019/0162142 A1   May 30, 2019

(30) Foreign Application Priority Data
Apr. 13, 2016 (DE) .......... 10 2016 206 180

(51) Int. Cl.
*F02M 59/46* (2006.01)
*F02M 63/00* (2006.01)
(Continued)

(52) U.S. Cl.
CPC ...... *F02M 63/0075* (2013.01); *F02M 59/466* (2013.01); *F16K 31/0696* (2013.01);
(Continued)

(58) Field of Classification Search
CPC ............ F16K 27/029; F16K 31/0686; F16K 31/0696; F02M 59/466; F02M 63/0075; F02M 2200/07; F02M 2200/09
(Continued)

(56) References Cited

U.S. PATENT DOCUMENTS 4,678,006 A * 7/1987 Northman ........... F16H 61/0009
137/596.17
4,690,374 A * 9/1987 Polach ................ F16K 31/0655
239/585.4
(Continued)

FOREIGN PATENT DOCUMENTS

CN   101089384 A   12/2007
CN   101680406 A   3/2010
(Continued)

OTHER PUBLICATIONS

International Search Report for Application No. PCT/EP2017/054766 dated Mary 19, 2017 (English Translation, 2 pages).

*Primary Examiner* — Seth W. Mackay-Smith
(74) *Attorney, Agent, or Firm* — Michael Best & Friedrich LLP

(57) ABSTRACT

A valve, in particular a suction valve (2), in particular in a high-pressure pump of a fuel injection system, has a valve element (14) that moves between an open position and a closed position, comprising a magnet armature (10) which is in mechanical contact with the valve element (14) in the axial direction and which is in contact with a first pressure spring (4) on the side facing away from the valve element (14), and wherein the magnet armature (10) can be axially moved via an electromagnetic actuation and same is supported in a starting position on a valve body (40) via a stop plate (20). The stop plate (20) is held in contact with the valve body (40) via a securing element (8).

21 Claims, 6 Drawing Sheets

(51) Int. Cl.
*F16K 31/06* (2006.01)
*F02M 59/36* (2006.01)

(52) U.S. Cl.
CPC ....... *F02M 59/368* (2013.01); *F02M 2200/07* (2013.01); *F02M 2200/09* (2013.01)

(58) Field of Classification Search
USPC ............. 251/129.15, 284; 335/248, 257, 277
See application file for complete search history.

(56) References Cited

U.S. PATENT DOCUMENTS

| | | | | |
|---|---|---|---|---|
| 4,721,254 | A * | 1/1988 | Horn | F02M 61/06 239/585.3 |
| 4,917,351 | A * | 4/1990 | Lindbloom | F16K 31/0651 251/129.05 |
| 4,947,893 | A * | 8/1990 | Miller | F16H 61/0021 137/625.65 |
| 5,393,132 | A * | 2/1995 | Yogo | B60T 8/367 251/129.07 |
| 5,513,673 | A * | 5/1996 | Slavin | F16K 31/0613 137/625.65 |
| 5,626,165 | A * | 5/1997 | Shinobu | F16K 31/0655 137/554 |
| 5,853,028 | A * | 12/1998 | Ness | G05D 16/2024 137/625.65 |
| 6,439,214 | B1 * | 8/2002 | Yew | F02M 63/0022 123/568.21 |
| 6,670,875 | B2 * | 12/2003 | Bircann | H01F 7/1607 251/129.15 |
| 9,771,908 | B2 * | 9/2017 | Pilgram | F02M 51/061 |
| 2003/0042456 | A1 * | 3/2003 | Makino | F02M 63/0019 251/129.16 |

FOREIGN PATENT DOCUMENTS

| | | | | |
|---|---|---|---|---|
| CN | 103180599 A | 6/2013 | | |
| CN | 104583575 A | 4/2015 | | |
| DE | 3500449 | 7/1986 | | |
| DE | 102013225162 | 6/2015 | | |
| DE | 102014215589 A1 * | 8/2015 | | ............ F02M 51/06 |
| DE | 102014214811 | 2/2016 | | |

\* cited by examiner

VALVE, IN PARTICULAR A SUCTION VALVE, IN A HIGH-PRESSURE PUMP OF A FUEL INJECTION SYSTEM

BACKGROUND OF THE INVENTION

The invention relates to a valve, in particular a suction valve, in a high-pressure pump of a fuel injection system. The invention furthermore relates to a pump, in particular a high-pressure pump of a fuel injection system, in which the suction valve is used.

A valve, in particular an electromagnetically controllable suction valve, of a high-pressure pump of a fuel injection system is known from DE 10 2013 225 162 A1. The suction valve has a valve element that can move between an open and a closed position, having a magnet armature, which is in mechanical contact with the valve element in the axial direction and which is in contact with a first compression spring on the side facing away from the valve element, and wherein the magnet armature can be moved axially by an electromagnetic actuation and, in a starting position, is supported on a valve body via a stop plate.

The magnet armature is part of an electromagnetic actuator, which furthermore comprises a magnet coil. When the magnet coil is energized, a magnetic field is formed, thereby causing the magnet armature to move relative to the magnet coil against a spring force in order to close a working air gap.

The high-pressure pump known from DE 10 2013 225 162 A1 for a fuel injection system having a suction valve, in which all the elements described above are surrounded by fuel, has certain disadvantages.

Owing to the highly dynamic switching movements of the armature, there is the possibility, in the case of a stop plate which is capable of free axial movement in the valve body, of increased wear at the point of contact between the stop plate and the valve body. This is due to the fact that, particularly if the stop plate adheres to the magnet armature, the stop plate moves away from the valve body. During the return movement, there can be a collision between the stop plate and the valve body, wherein a high impelling force is exerted on the valve body and, during this process, the additional mass of the magnet armature, in particular, acts on the stop plate. This effect is intensified by the fact that the stop plate is composed of a harder material, and the relatively soft material of the valve body can be severely damaged as a result. As a result, there can be removal of material from the valve body in the region of contact and impairment of functioning or even a reduction in the life of the suction valve and thus of the high-pressure pump.

Moreover, the working air gap is enlarged by the wear and the loss of material on the valve body. This can lead to a restriction in the functioning of the suction valve or to a complete loss of functioning of the suction valve.

Adhesion of the stop plate to the magnet armature can furthermore lead to partial covering of the axial compensating holes in the magnet armature for an indefinite period of time. As a result, only limited flow of the surrounding fluid through the magnet armature is possible, with the result that there are unwanted fluctuations in the valve switching times. Furthermore, this effect of adhesion of the stop plate to the moving magnet armature is intensified in such a way that there can be increased adhesion of the stop plate to the magnet armature during an axial movement of the magnet armature in the direction of the valve body, owing to the direction of flow of the surrounding fluid. Adhesion and thus partial covering of the axial compensating holes in the magnet armature furthermore impairs the positive effects of the fluid flowing through, such as heat dissipation and/or removal of dirt from the suction valve.

SUMMARY OF THE INVENTION

The configuration according to the invention of the suction valve has the advantage that damage to a valve body by a stop plate making contact with an impelling force is prevented since the stop plate is held in contact with the valve body in the axial direction. On the one hand, this results in an extended life of the suction valve and thus of the entire high-pressure pump and, on the other hand, it results in a lower probability of failure of the suction valve. This is due to the fact that the formation of abrasive particles is reduced since damage to the valve body by the impinging stop plate is prevented.

Furthermore, the configuration of the suction valve in accordance with the invention has the advantage that avoidance and/or reduction of removal of material and damage to the valve body is achieved. As a result, enlargement of the working air gap over the life of the suction valve can be avoided, thereby making it possible to prevent restriction of the functioning of the suction valve or complete loss of functioning.

The configuration of the suction valve in accordance with the invention furthermore has the advantage that adhesion of the stop plate to the magnet armature is avoided. This makes it possible to prevent the occurrence of partial covering of axial compensating holes in the magnet armature. This has the advantage that unwanted fluctuating valve switching times, caused by restricted flow of the surrounding fluid through the magnet armature in both axial directions, depending on the axial direction of movement of the magnet armature, are prevented. Thus, the configuration of the suction valve in accordance with the invention ensures optimum removal of dirt from the suction valve and optimum cooling by the fluid flowing through.

According to the further features of the dependent claims, the inventive configuration of the valve or of the pump has further advantages over the prior art:

It is advantageous that a nonpositive and/or positive connection of a securing element to the valve element ensures that the stop plate is held reliably on the valve body in the axial direction for the life of the suction valve and thus of the high-pressure pump.

This reliable connection of the securing element to the valve element enables the stop plate and the valve body to be held in contact and thus ensures that an increase in the reliability and life of the suction valve is achieved.

Another advantage consists in that the securing element is connected positively and/or nonpositively to the stop plate. By this means, the stop plate can be held firmly on the valve body, and the stop plate can be prevented from moving axially away from the valve body. This, in turn, has the advantage that damage to the valve body is reduced and thus the probability of failure of the suction valve is reduced.

It is furthermore advantageous that a positive connection between the stop plate and the securing element is produced in such a way that machining of both parts in the course of production can be carried out with relatively little outlay since radial tolerance differences between the inside diameter of the stop plate and the outside diameter of the securing element can be compensated through elasticity of the securing element in the radial direction. By virtue of the beveling of the components comprising the stop plate and the securing element in the region of contact thereof and by virtue of the elasticity of the securing element, both components can furthermore also align themselves in the axial direction in such a way that contact between the stop plate component and the valve body is ensured in all cases. Even if there is a certain scatter in the outside and inside diameter tolerances during the production of the components, it is thus possible to ensure that the valve body and the stop plate are held reliably in contact. Cost savings during production are thereby possible.

A further advantage of the configuration according to the invention of the suction valve consists in that the use of the principle of latching makes it possible to achieve positive fixing of the securing element on the valve body and/or on the stop plate. In the case of the latching principle according to the invention, no further materials, such as adhesives or welding material, have to be used; instead, the positive connection can be achieved through the structural shaping of the components relative to one another. As a result, the assembly time can be shortened and costs can be saved by virtue of saved joining material and a shortened assembly time.

Moreover, the design configuration of the elements comprising the stop plate and the valve element requires only a low outlay on production since an encircling recess is formed uniformly and can be made in the respective component by means of a single production step. This leads to a cost saving and time saving in production.

The embodiment according to the invention of the securing element as an elastic element has a further advantage since in this way tolerance fluctuations in the axially relevant dimensions on the stop plate, on the valve body and also on the securing element, in particular in the tolerance chain of the elements, can be compensated. This reduces susceptibility to faults but also the production costs for the elements since an expanded tolerance range of the individual parts at the production level can be taken as a basis.

Furthermore, there is the advantage that the securing element is embodied as a one-piece solution. This reduces any susceptibility of the component to faults during assembly and in the assembled state since the vulnerability of a connection between a plurality of components is eliminated in the case of a one-piece solution. This reduces the susceptibility of the suction valve to failure.

The invention furthermore offers the advantage of simplified assembly by means of a first encircling recess in the valve body and by means of a second encircling recess in the stop plate since they can each form a positive connection with a first encircling raised portion and/or a second encircling raised portion of the securing element. Thus, the securing element has only to be inserted into the valve body and the stop plate and forms a stable joint by means of the latching principle. This reduces the effort involved in assembly and the costs which occur during assembly.

The configuration according to the invention of a fixing bush as an elastic element simplifies assembly since an improvement in the latching effect can be achieved.

By means of an optimized leading and trailing region of the raised portion, which can be embodied in such a way as to be straight, beveled or rounded, the fixing bush will slide almost automatically into the recess in the stop plate and in the valve element and can thus form a positive connection. The assembly forces can thus be reduced and a time saving and cost saving are obtained during assembly.

Further advantages of the method for producing the suction valve according to the invention:

By virtue of the fact that the securing element is first of all moved into a correct position relative to the stop plate and to the valve body and is then formed in such a way in a second step that a positive connection arises, the securing element can be produced while having to maintain less narrow tolerances. The final shaping to bring the securing element into a positive connection with the stop plate and the valve body can be accomplished by the method of forming. This results in a saving in production costs. Moreover, simplified assembly in just 2 steps is possible, this being obtained by insertion of the securing element and the subsequent forming. Here, advantages are obtained through a reduction in the assembly time and assembly costs.

BRIEF DESCRIPTION OF THE DRAWINGS

An illustrative embodiment of the invention is shown in the drawing and explained in greater detail in the following description. In the drawing.

DETAILED DESCRIPTION

Figure 1:
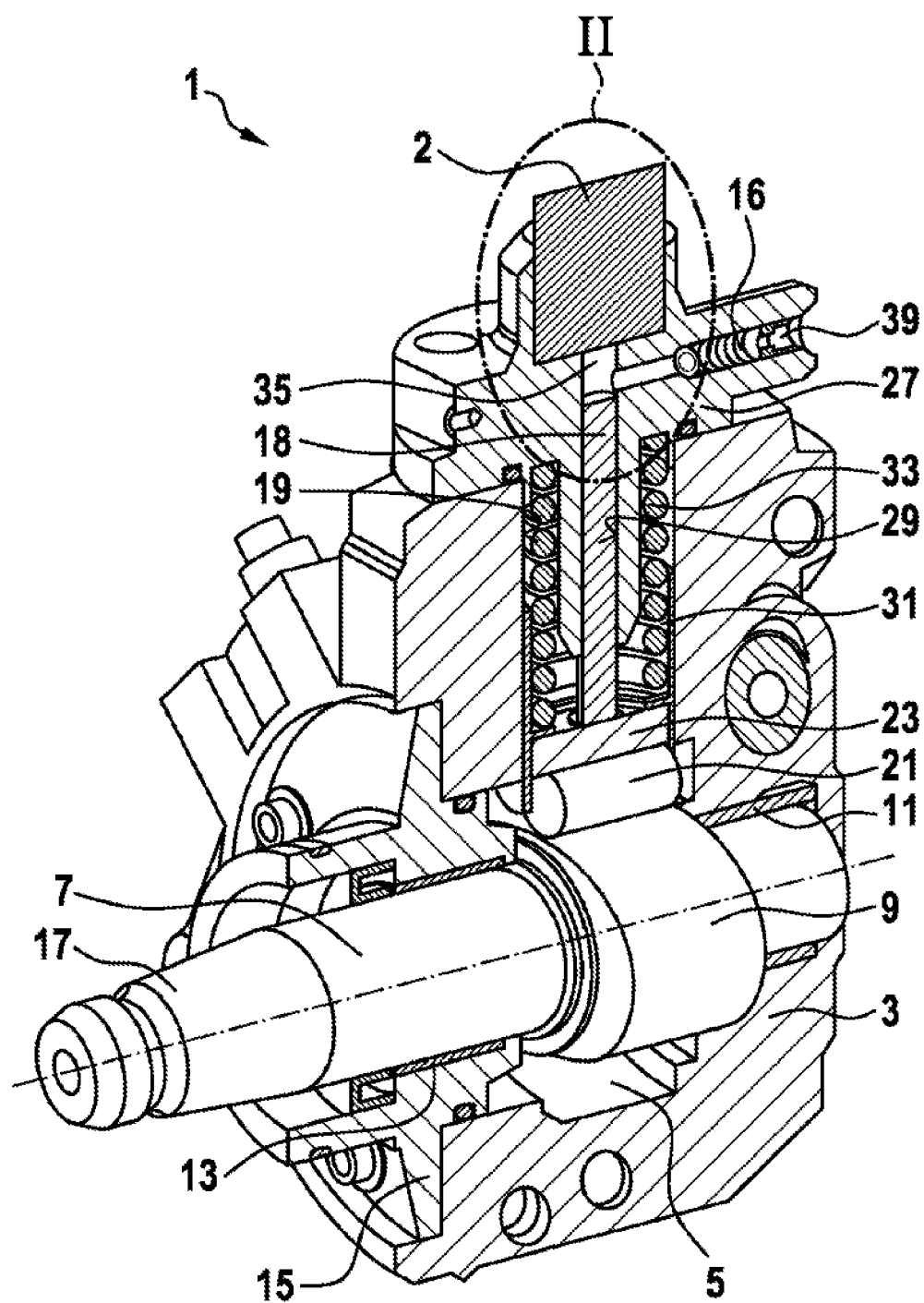
FIG. 1 shows a pump in a longitudinal section.

FIG. 1 shows a section through a schematically illustrated high-pressure pump 1, which is designed as a high-pressure fuel pump and is preferably installed in a common rail injection system. By means of the high-pressure pump 1, fuel supplied by a low-pressure fuel system, which has at least a tank, a filter and a low-pressure pump, is pumped into a high-pressure reservoir, from which the fuel stored there is taken by fuel injectors for injection into associated combustion chambers of an internal combustion engine. The supply of the fuel to a pump working space 35 takes place via an electromagnetically controllable suction valve 2, wherein the electromagnetically controllable suction valve is further explained below and is installed on the high-pressure pump 1.

The high-pressure pump 1 has a pump casing 3 having a camshaft space 5. A camshaft 7 having a cam 9 designed, for example, as a double cam projects into the camshaft space 5. The camshaft 7 is mounted in two bearings, which are arranged on both sides of the cam 9 and are designed as radial bearings, these bearings being in the form of a casing bearing 11 arranged in the pump casing 3 and of a flange bearing 13, which is arranged in a flange 15 connected to the pump casing 3 and sealing off the camshaft space 5 in a leak tight manner with respect to the environment. The flange 15 has a through opening, through which a drive-side end portion 17 of the camshaft 7 projects. The drive-side end portion 17 has a taper, for example, on which a driving wheel is mounted and secured. The driving wheel is designed as a belt pulley or a gearwheel, for example. The driving wheel is driven directly or indirectly, e.g. via a belt drive or a gear mechanism, by the internal combustion engine.

Also inserted into the pump casing 3 there is a tappet guide 19, into which a roller tappet 23 having a running roller 21 is inserted. The running roller 21 runs on the cam 9 of the camshaft 7 during a rotary motion of the latter, and the roller tappet 23 is thus moved up and down in translation in the tappet guide 19. During this process, the roller tappet 23 interacts with a pump plunger 18, which is arranged in a cylinder bore 29, formed in a pump cylinder head 27, in such a way that it can likewise be moved up and down in translation.

Arranged in a tappet spring space 31 formed by the tappet guide 19 and the cylinder bore 29 is a tappet spring 33, which is supported at one end on the pump cylinder head 27 and at the other end on the roller tappet 23 and ensures continuous contact between the running roller 21 and the cam 9 in the direction of the camshaft 7. Formed in the pump cylinder head 27, as an extension of the pump plunger 18, is the pump working space 35, into which fuel is introduced via the electromagnetically controllable suction valve 2. The introduction of the fuel takes place during a downward movement of the pump plunger 18, while, during an upward movement of the pump plunger 18, fuel present in the pump working space 35 is pumped into the high-pressure reservoir via a high-pressure outlet 39 with an inserted outlet valve 16, via an onward-leading high-pressure line. Overall, the high-pressure pump 1 is fuel-lubricated, wherein the fuel is pumped from the low-pressure system into the camshaft space 5, which is connected in terms of flow to the suction valve 2. This electromagnetically controllable suction valve 2 and the functionality thereof are described below.

In the suction mode of the high-pressure pump 1, the electromagnetically controllable suction valve 2 is opened, and a connection between the pump working space 35 and a fuel inlet 26 is established, with the result that fuel is fed to the pump working space 35 via the suction valve 2. In the delivery mode of the high-pressure pump 1, the fuel fed to the pump working space 35 is compressed and is fed via the high-pressure valve 16 arranged in the high-pressure outlet 39 to a high-pressure reservoir (not shown). In the compression mode of the high-pressure pump 1, in which the pump plunger 18 moves upward, the suction valve 2 is closed when fuel delivery is supposed to take place, and it seals off the pump working space 35 from the fuel inlet 26.

Figure 2:
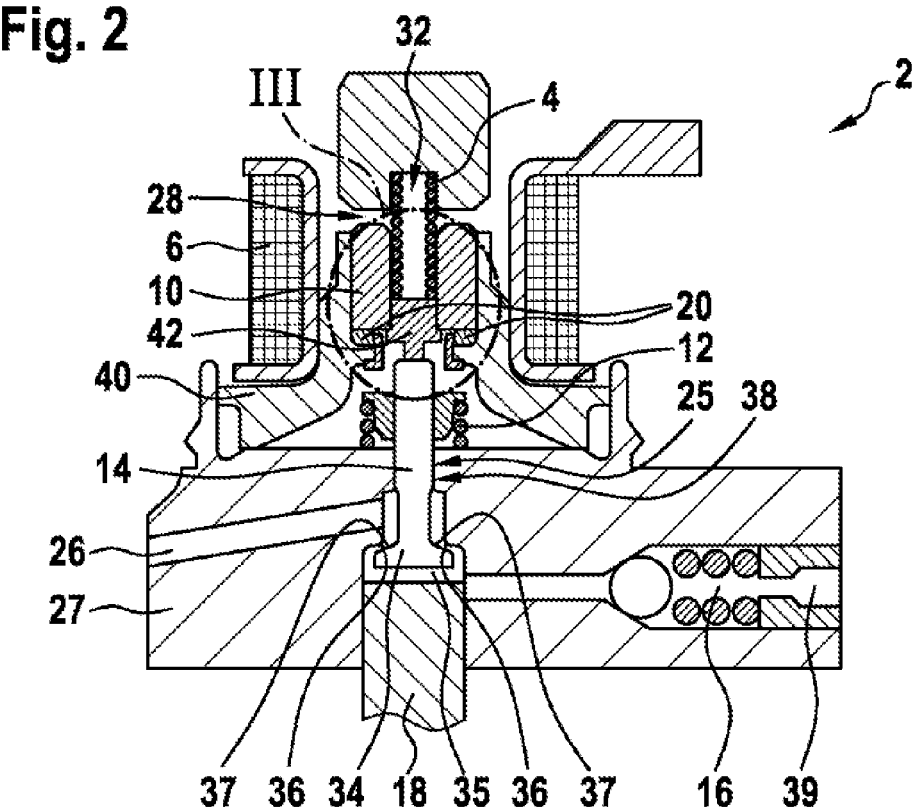
FIG. 2 shows a detail, denoted by II in FIG. 1, of the pump in an enlarged illustration with a suction valve.

The electromagnetically controllable suction valve 2 illustrated in FIG. 2, which is mounted on the high-pressure pump 1, has a plunger-shaped valve element 14. The plunger-shaped valve element 14 has a stem 25, in particular a cylindrically shaped stem 25, and an enlarged head 34. Moreover, the pump cylinder head 27 has a valve seat 36 in the region of contact with the closed valve element 14. The plunger-shaped valve element 14 is guided in a bore 38 in the pump cylinder head 27 by means of the stem 25 and has a head 34 which is enlarged in diameter relative to the stem 25. Formed on this enlarged head 34 of the valve element 14 is a sealing surface 37, which comes to rest on the valve seat 36 in the pump cylinder head 27 in the closed position of the valve element 14. As a result, the pump working space 35 is separated from the fuel inlet 26 and no fuel can flow back. The elements of an electromagnetic actuator are illustrated in FIG. 2: this has a magnet armature 10 having a cylindrical outer contour and a central bore 32. A first compression spring 4 furthermore projects into this central bore 32 of the magnet armature 10, exerting an axial force on the magnet armature 10 toward the valve element 14. The magnet armature 10 is furthermore guided axially in a valve body 40 in such a way that it can perform a stroke motion, wherein there is a stop plate 20 in the axial direction between the valve body 40 and the magnet armature 10. In the radial direction, the magnet armature 10 is surrounded by a magnet coil 6, which when energized forms a magnetic field and can thus exert a magnetic force on the magnet armature 10.

The valve element 14 is in contact with the magnet armature 10 via an armature stud 42, wherein the two elements are not connected to one another in the axial direction but are only held in contact with one another by magnetic forces and spring forces. The plunger-shaped valve element 14 is furthermore acted upon in the closing direction by the spring force of a second compression spring 12. The first compression spring 4 acts in the axial direction on the armature stud 42 and the magnet armature 10. In the deenergized state, the first compression spring 4 ensures that the armature stud 42 acts on the valve element 14 and holds it in an open position. Admittedly, this is counteracted by the second compression spring 12, but because the first compression spring 4 has a higher spring force the valve element 14 is held in an open state. Due to energization of the magnet armature 10 by means of the magnet coil 6, the magnet armature 10 moves away from the valve element 14, against the force of the first compression spring 4, in order to close the working air gap 28. Owing to the movement away, the armature stud 42 loses the nonpositive contact with the valve element 14, as a result of which the valve element 14 moves in the direction of the closed state owing to the force of the second compression spring 12. In the fully closed state of the valve element 14, it rests by means of the sealing surface 37 on the valve seat 36 and seals off the pump working space 35 from the fuel inlet 26.

Various illustrative embodiments of the combination of a securing element 8 with the stop plate 20 and the valve body 40 are explained below with reference to FIGS. 3 to 7.

Figure 3:
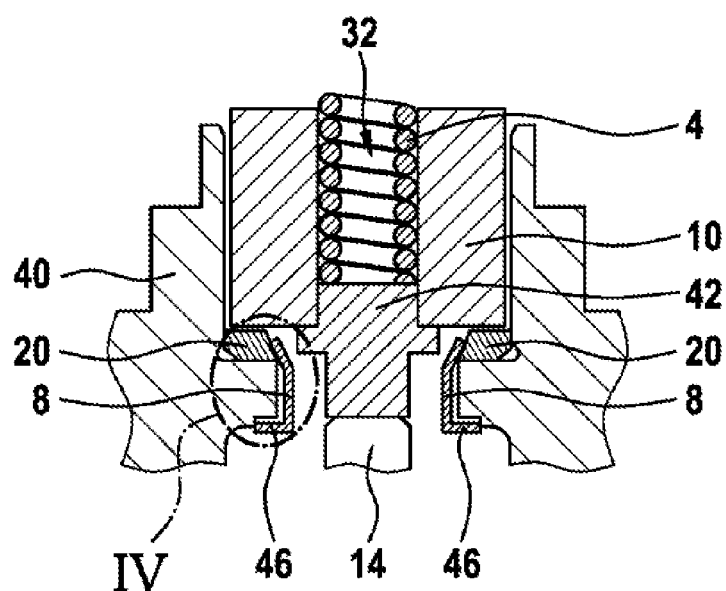
FIG. 3 shows a detail, denoted by III in FIG. 2, of the suction valve in an enlarged illustration in accordance with a first illustrative embodiment, wherein a stop plate has an undercut and/or a bevel, and a securing element forms a first encircling raised portion.

The detail III illustrated in FIG. 3 shows a section through the suction valve 2 in accordance with a first illustrative embodiment. The section shows the securing element 8, which is connected positively to the valve element 40 and the stop plate 20 and, in this first illustrative embodiment, forms just one first radially outward-projecting encircling raised portion 46. Also illustrated are the valve element 14 and the armature stud 42, which, in particular, can be press-fitted into the central bore 32 of the magnet armature 10 and is subjected to the spring force of the first compression spring 4. Moreover, the securing element 8 is in contact in the axial direction, by means of the first encircling raised portion 46, with the valve body 40.

Figure 4:
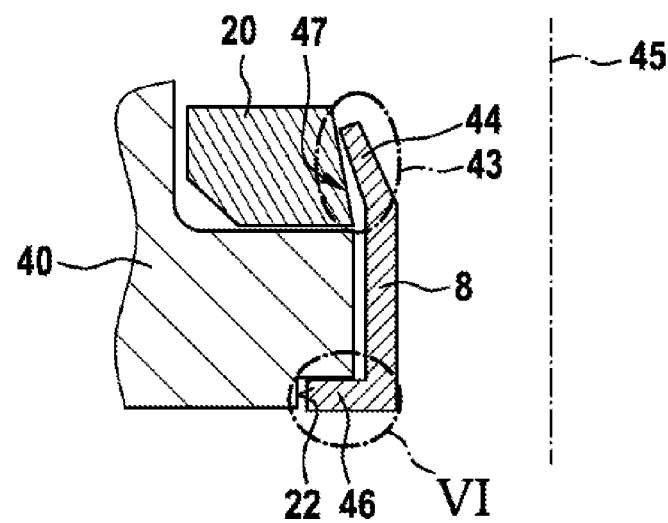
FIG. 4 shows a detail, denoted by IV in FIG. 3, of the suction valve in an enlarged illustration in accordance with the first illustrative embodiment, wherein the stop plate has the undercut and/or the bevel.

FIG. 4 illustrates the first illustrative embodiment, in which the securing element 8 has only the first encircling raised portion 46. The valve body 40 is a first encircling recess 22, which, in particular, is embodied as a step, against which the first encircling raised portion 46 of the securing element 8 rests in the axial direction, whereby the valve element 40 forms a positive connection to the securing element 8. In this case, the securing element 8 can be embodied, in particular, as a fixing bush 8. Here, the fixing bush 8 has, on the side facing the magnet armature 10, a radially outward-extending beveled profile 44, which engages behind a region of the stop plate 20 provided with an undercut 47 and thereby forms a positive connection to the stop plate 20. In particular, a region of contact 43 between the stop plate 20 and the fixing bush 8 is formed in this case.

A center line 45 is furthermore illustrated in FIG. 4. The fixing bush 8 is formed around this center line 45, in particular in a rotationally symmetrical manner, wherein the region of the first encircling raised portion 46 and the region with the beveled profile project radially outward. In the region of its outside diameter, the securing element is furthermore at least partially in contact with the inside diameter of the valve body 40 and the inside diameter of the stop plate 20.

Figure 5:
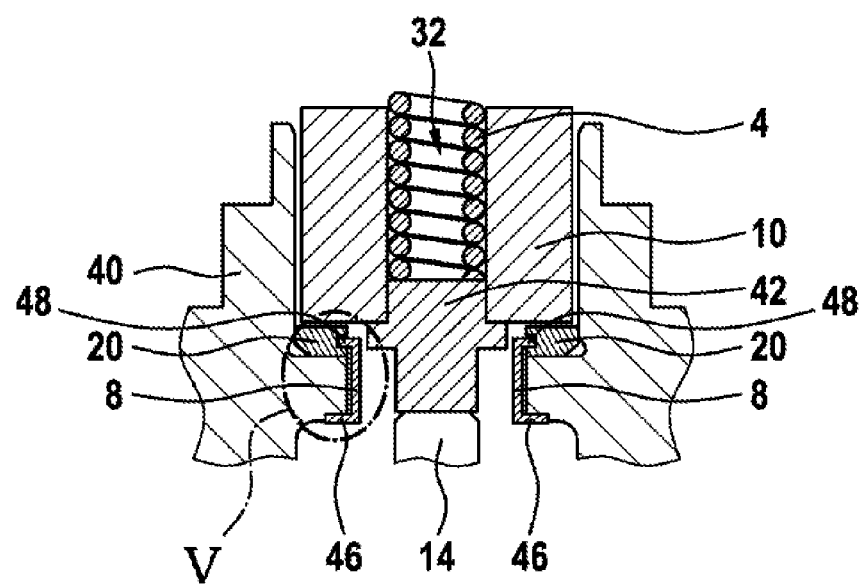
FIG. 5 shows a detail, denoted by III in FIG. 2, of the suction valve in accordance with a second illustrative embodiment, wherein the securing element has the first encircling raised portion and a second encircling raised portion on the outside diameter.

FIG. 5 shows the detail III from FIG. 2, in which a section through the suction valve 2 in accordance with a second illustrative embodiment is illustrated. The section shows the securing element 8, which is connected positively to the valve element 40 and the stop plate 20 and, in this second illustrative embodiment, forms the first encircling raised portion 46 and a second encircling raised portion 48. In this case, the securing element 8 can be embodied, in particular, as a fixing bush 8. The valve element 14 and the armature stud 42 are furthermore illustrated, wherein the armature stud 42 can, in particular, be press-fitted into the central bore 32 of the magnet armature 10 and is subjected to the spring force of the first compression spring 4. On the side facing away from the magnet armature, the fixing bush 8 is in contact by means of the first encircling raised portion 46 with the valve body 40. On the side facing the magnet armature 10, the fixing bush 8 furthermore forms a positive connection with the stop plate 20 since, here, the second encircling raised portion 48 of the fixing bush 8 projects into a second encircling recess 24 in the stop plate 20.

Figure 6:
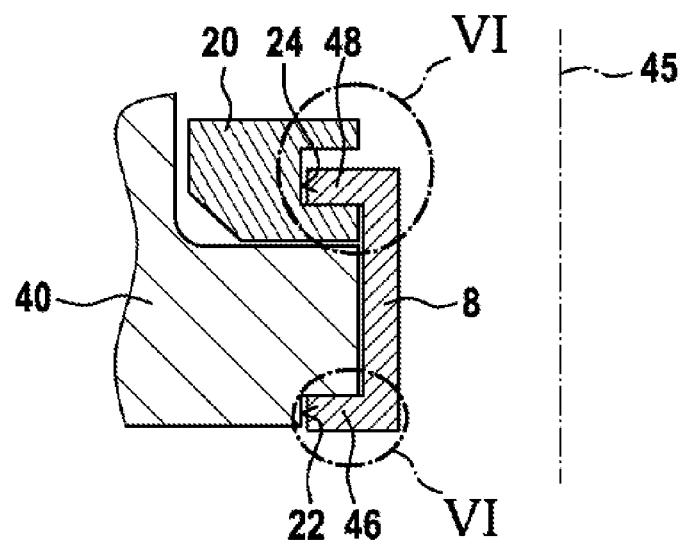
FIG. 6 shows a detail, denoted by V in FIG. 4, of the suction valve in an enlarged illustration in accordance with the second illustrative embodiment, wherein the securing element has the first encircling raised portion and the second encircling raised portion on the outside diameter.

FIG. 6 illustrates the second illustrative embodiment, in which the securing element 8 has the first encircling raised portion 46 and the second encircling raised portion 48. In this case, the securing element 8 can, in particular, be embodied as a fixing bush 8. The valve body 40 has the first encircling recess 22, which, in particular, is embodied as a step, against which the first encircling raised portion 46 of the fixing bush 8 rests in the axial direction, whereby the valve element 40 forms a positive connection to the securing element 8. On the side facing the magnet armature 10, the fixing bush 8 furthermore has the second encircling raised portion 48, which projects into the second encircling recess 24 in the stop plate 20. A positive connection can thereby be formed by the stop plate 20 and the securing element 8. A center line 45 is furthermore illustrated in FIG. 6. The fixing bush 8 is formed around this center line 45, in particular in a rotationally symmetrical manner, wherein the region of the first encircling raised portion 46 and the region of the second encircling raised portion 48 project radially outward. In the region of its outside diameter, the securing element is furthermore at least partially in contact with the inside diameter of the valve body 40 and the inside diameter of the stop plate 20.

Figure 7:
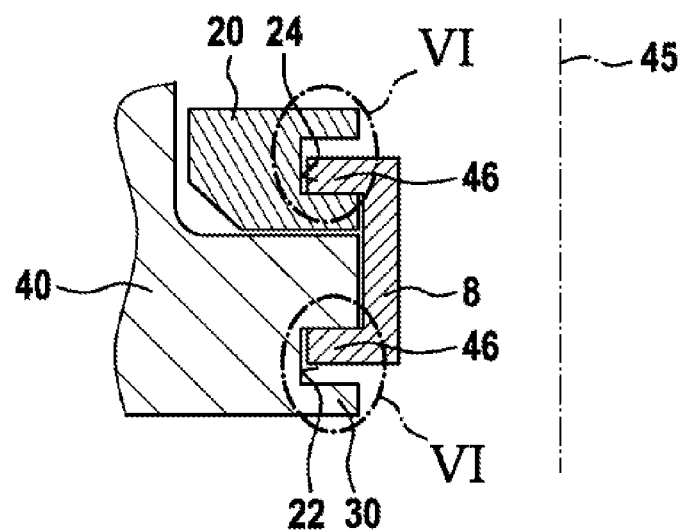
FIG. 7 shows a detail, denoted by V in FIG. 4, of the suction valve in an enlarged illustration in accordance with a third illustrative embodiment, wherein the securing element has the first encircling raised portion and the second encircling raised portion on the outside diameter.

FIG. 7 shows a third illustrative embodiment, in which the securing element 8 has the first encircling raised portion 46 and the second encircling raised portion 48. In this case, the securing element 8 can, in particular, be embodied as a fixing bush 8. In contrast to the second illustrative embodiment, the valve body 40 does admittedly also have the first encircling recess 22 but this is not embodied as a step but is relocated in the axial direction into the component comprising the valve body 40, and the valve body 40 forms an additional collar 30 on the side facing away from the stop plate 20. The fixing bush 8 projects in the radial direction into this first encircling recess 22 in the valve body 40 by means of the first encircling raised portion 46 and thereby forms a positive connection. On the side facing the magnet armature 10, the fixing bush 8 furthermore has the second encircling raised portion 48, which projects into the second encircling recess 24 in the stop plate. A positive connection can thereby be formed by the stop plate 20 and the fixing bush 8.

A center line 45 is furthermore illustrated in FIG. 7. The fixing bush 8 is formed around this center line 45, in particular in a rotationally symmetrical manner, wherein the region of the first encircling raised portion 46 and the region of the second encircling raised portion 48 project radially outward. In the region of its outside diameter, the securing element is furthermore at least partially in contact with the inside diameter of the valve body 40 and the inside diameter of the stop plate 20.

Figure 8:
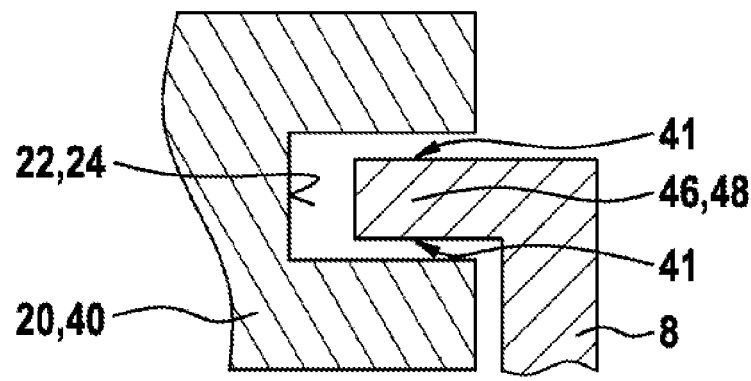
FIG. 8 shows a detail, denoted by VI in FIGS. 5, 6 and 7, in particular of the fixing bush in an enlarged illustration, wherein the fixing bush has a straight profile in the leading and trailing region of the raised portion in the region of the first and/or of the second encircling raised portions.
Figure 9:
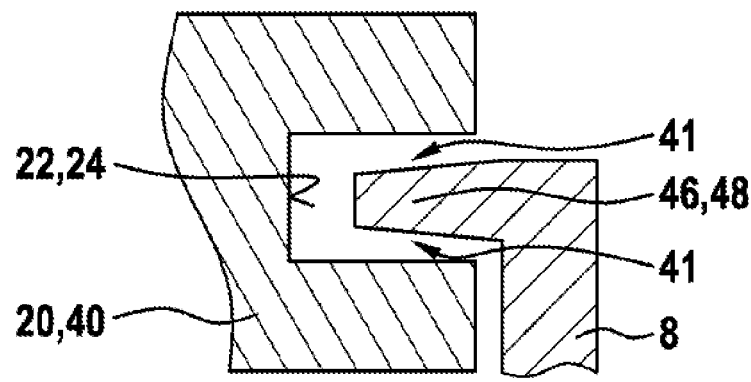
FIG. 9 shows a detail, denoted by VI in FIGS. 6 and 7, in particular of the fixing bush in an enlarged illustration, wherein the fixing bush has a beveled profile in the leading and trailing region of the raised portion in the region of the first and/or of the second encircling raised portions.
Figure 10:
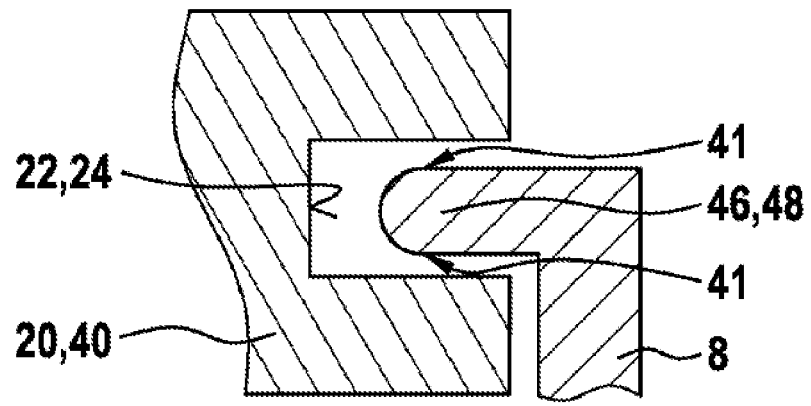
FIG. 10 shows a detail, denoted by VI in FIGS. 6 and 7, in particular of the fixing bush in an enlarged illustration, wherein the fixing bush has a rounded profile in the leading and trailing region of the raised portion in the region of the first and/or of the second encircling raised portions.

Various embodiments are illustrated in FIGS. 8 to 10, showing the character of the profile of the first encircling raised portion 46 or of the second encircling raised portion 48 in the respective leading and trailing region, by means of which the fixing bush 8 projects into the first encircling recess 22 in the valve body 40 or the second encircling recess 24 in the stop plate 20.

FIG. 8 shows a first embodiment of the first encircling raised portion 46 and/or of the second encircling raised portion 48, in which a profile 41 of the raised portion 46, 48 is of a straight character in the leading and trailing region.

FIG. 9 shows a second embodiment of the first encircling raised portion 46 and/or of the second encircling raised portion 48, in which the profile 41 of the raised portion 46, 48 is of a beveled character in the leading and trailing region.

FIG. 10 shows a third embodiment of the first encircling raised portion 46 and/or of the second encircling raised portion 48, in which the profile 41 of the raised portion 46, 48 is of a rounded character in the leading and trailing region.

The above-explained illustrative embodiments and embodiments of the securing element 8 and/or of the fixing bush 8, of the stop plate 20 and of the valve body 40 can be combined with one another in any desired manner.

The invention claimed is:

1. A valve comprising a valve element (14) configured to move between an open position and a closed position, and a magnet armature (10), which is in mechanical contact with the valve element (14) in an axial direction and which is in contact with a first compression spring (4) on a side facing away from the valve element (14), and wherein the magnet armature (10) is configured to be moved axially by an electromagnetic actuation and, in a starting position, is supported on a valve body (40) via a stop plate (20), characterized in that the stop plate (20) is held in contact with the valve body (40) in the axial direction by a securing element (8), wherein the securing element (8) contacts the valve body (40) and the stop plate (20) and is radially inward from the valve body (40) and the stop plate (20).

2. The valve as claimed in claim 1, characterized in that the securing element (8) is connected to the valve body (40).

3. The valve as claimed in claim 2, characterized in that the securing element (8) is latched onto the valve body (40) to provide a positive connection of the securing element (8) to the valve body (40).

4. The valve as claimed in claim 3, characterized in that the securing element (8) extends into a first encircling recess (22) in the valve body (40) to provide the positive connection.

5. The valve as claimed in claim 3, characterized in that the securing element (8) is elastic.

6. The valve as claimed in claim 1, characterized in that the securing element (8) is connected to the stop plate (20).

7. The valve as claimed in claim 6, characterized in that the stop plate (20) has an undercut and/or a bevel (47) in a region of an inside diameter which is in contact with the securing element (8).

8. The valve as claimed in claim 6, characterized in that the stop plate (20) has an undercut and/or a bevel (47) in a region of an inside diameter which is in contact with the securing element (8), wherein the securing element (8) overlaps the region of the undercut (47) of the stop plate, with the result that a region of contact (43) between the stop plate (20) and the securing element (8) is formed.

9. The valve as claimed in claim 6, characterized in that the securing element (8) is latched to the stop plate (20) to provide a positive connection of the securing element (8) to the stop plate (20).

10. The valve as claimed in claim 9, characterized in that the securing element (8) extends into a second encircling recess (24) in the stop plate (20) to provide the positive connection.

11. The valve as claimed in claim 9, characterized in that the securing element (8) is elastic.

12. The valve as claimed in claim 1, characterized in that the securing element is embodied as a fixing bush (8).

13. The valve as claimed in claim 12, characterized in that the fixing bush (8) has, on an outside diameter, a first encircling raised portion (46), which latches into a first encircling recess (22) in an inside diameter of the valve body (40), and/or has a second encircling raised portion (48), which projects into a second encircling recess (24) in an inside diameter of the stop plate (20).

14. The valve as claimed in claim 13, characterized in that the first encircling raised portion (46) and/or the second encircling raised portion (48) on the outside diameter of the fixing bush (8) has/have either a straight, a beveled or a rounded profile (41) in a leading and a trailing region of said fixing bush.

15. A method for producing a valve as claimed in claim 1, characterized in that the securing element (8) is deformed in such a way during assembly that the securing element forms a positive connection to the stop plate (20), wherein the securing element (8) is supported on the valve body (40) by contact in the axial direction, and thus the stop plate (20) and the valve body (40) are held in contact by the securing element (8).

16. A high-pressure pump (1) of a fuel injection system having a suction valve (2) as claimed in claim 1.

17. The valve as claimed in claim 1, characterized in that the securing element (8) is connected to the valve body (40), wherein the positive engagement is achieved in such a way that the securing element (8) is supported on the valve body (40) by contact in the axial direction.

18. The valve as claimed in claim 1, characterized in that the securing element (8) is connected to the stop plate (20), wherein the positive engagement is achieved in such a way that the securing element (8) is supported on the stop plate (20) by contact in the axial direction.

19. The valve as claimed in claim 1, wherein the securing element (8) and the stop plate (20) are generally annular, wherein the valve body (40) has a centerline (45) and has an annular radially inwardly extending portion having a first axial surface that is perpendicular to the centerline (45) and that faces in one axial direction and a second axial surface that is perpendicular to the centerline (45) and that faces in an opposite axial direction, wherein the second axial surface has a first encircling recess (22) into which a flange-like portion of the securing element (8) extends, wherein the stop plate (20) sits on the first axial surface, and wherein the stop plate (20) has a bevel (47) engaged by a radially outwardly angled portion (44) of the securing element (8).

20. The valve as claimed in claim 1, characterized in that the securing element is embodied as a fixing bush (8), which is embodied in a rotationally symmetrical way and is in contact all the way round with the inside diameter of the valve body (40) and the inside diameter of the stop plate (20).

21. A valve comprising a valve element (14) configured to move between an open position and a closed position, and a magnet armature (10), which is in mechanical contact with the valve element (14) in an axial direction and which is in contact with a first compression spring (4) on a side facing away from the valve element (14), and wherein the magnet armature (10) is configured to be moved axially by an electromagnetic actuation and, in a starting position, is supported on a valve body (40) via a stop plate (20), characterized in that the stop plate (20) is held in contact with the valve body (40) in the axial direction by a securing element (8), wherein the securing element is embodied as a fixing bush (8), which is embodied in a rotationally symmetrical way and is in contact all the way round with the inside diameter of the valve body (40) and the inside diameter of the stop plate (20).

* * * * *